United States Patent [19]

Slade

[11] Patent Number: 5,140,494

[45] Date of Patent: Aug. 18, 1992

[54] GAS TURBINE ENGINE TIP CLEARANCE SENSORS

[75] Inventor: Robert A. Slade, Glastonbury, England

[73] Assignee: Rolls-Royce plc, London, England

[21] Appl. No.: 486,927

[22] Filed: Mar. 1, 1990

[30] Foreign Application Priority Data

Mar. 7, 1989 [GB] United Kingdom ................ 8905156

[51] Int. Cl.[5] .............................................. H05F 1/00
[52] U.S. Cl. .................................. 361/212; 361/231; 324/660; 324/662; 324/684
[58] Field of Search ............... 361/212, 216, 217, 231, 361/235, 181, 280, 285, 213; 307/116, 308; 340/870.37, 620; 324/660–663, 684, 687, 688

[56] References Cited

U.S. PATENT DOCUMENTS

| 4,063,167 | 12/1977 | Duly | 324/61 R |
|---|---|---|---|
| 4,388,667 | 6/1983 | Saurenman | 361/231 |
| 4,618,909 | 10/1988 | Sanders | 361/212 |
| 4,630,167 | 12/1986 | Huggins | 361/213 |
| 4,806,848 | 2/1989 | Demers | 326/61 R |
| 4,823,071 | 4/1989 | Ding et al. | 324/61 R |
| 4,878,149 | 10/1989 | Stiehl et al. | 361/230 |
| 4,980,796 | 12/1990 | Huggins | 361/231 |

Primary Examiner—Steven L. Stephan
Assistant Examiner—Adolf Berhane
Attorney, Agent, or Firm—Oliff & Berridge

[57] ABSTRACT

This invention provides a means for restoring the output waveform of a DC capacitive tip clearance sensor 26 which has been effected by electrical noise in an ion rich environment such as for example a gas turbine engine turbine section 16. The means comprises a pair of electrodes 28,30 each of which is polarized to either a high positive or a high negative potential. The probes 28,30 are situated upstream of the sensor 26 and act to remove any charge carriers from the gas stream before the gas reaches the sensor 26. The sensor 26 may then operate without experiencing undesirable fluctuations in its voltage output.

1 Claim, 2 Drawing Sheets

GAS TURBINE ENGINE TIP CLEARANCE SENSORS

FIELD OF THE INVENTION

This invention relates to gas turbine engine tip clearance sensors and more particularly to a method of reducing and possibly eliminating electrical noise which effects the sensors performance.

DESCRIPTION OF THE PRIOR ART

DC capacitance probes are already well known in gas turbine engines and are commonly used to determine the clearance between the tips of a row of rotor blades and the casing adjacent thereto. Generally, the probe is housed in the casing and the distance between any one rotor blade tip and itself is determined by measuring the capacitance of the air gap therebetween. Such probes are compact, simple in both operation and construction and comparatively inexpensive.

It has been found that whilst the above mentioned sensors work perfectly well in a comparatively clean air environment, such as for example a gas turbine engine's compressor, their performance is severely debilitated when they are operated in the combustion gas rich environment of the turbine. The combustion gasses are rich in +ve and −ve ions which interfere with the sensors strong electrical charge and cause it to give inaccurate readings or even totally incapacitate the sensor.

The above mentioned problem may be overcome by for example using an AC Polarised Sensor instead of a DC Sensor. These sensors are however considerably more expensive, complex and bulkier than the DC Sensors. The size in particular prevents them from being used in certain turbine applications where space for instrumentation is severely limited.

BRIEF SUMMARY OF THE INVENTION

It is an object of the present invention to provide a means for overcoming the disadvantages of DC probes and thereby allow them to be used effectively in the ion rich environment of a gas turbine engine compressor.

This invention provides means for removing electrical charge carrying elements in a gaseous flow having a capacitive measuring device situated therein, the means comprising a pair of electrodes, positioned upstream of the measuring device, the first of which is polarised to a positive potential and the second of which is polarised to a negative potential, thereby to produce an electric field.

BRIEF DESCRIPTION OF THE DRAWINGS

The present invention will now be described by way of example only with reference to the accompanying drawings, in which.

DETAILED DESCRIPTION OF THE PREFERRED EMBODIMENTS

Figure 1:
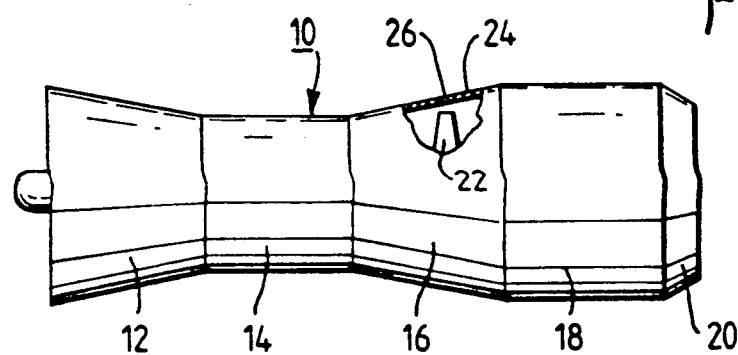
FIG. 1 is a partial cross-sectional view of a gas turbine engine incorporating the present invention.

Referring to FIG. 1, a gas turbine engine 10 comprises in flow series an axial flow compressor 12, combustion means 14, turbine means 16 positioned downstream of the combustion means 14 to drive the compressor 12, an exhaust duct 18 and an exhaust nozzle 20. A portion of the casing 24 of the turbine 16 of said engine is provided with a capacitive tip clearance sensor shown at 26 adjacent the tip of a turbine blade 22.

Figure 2:
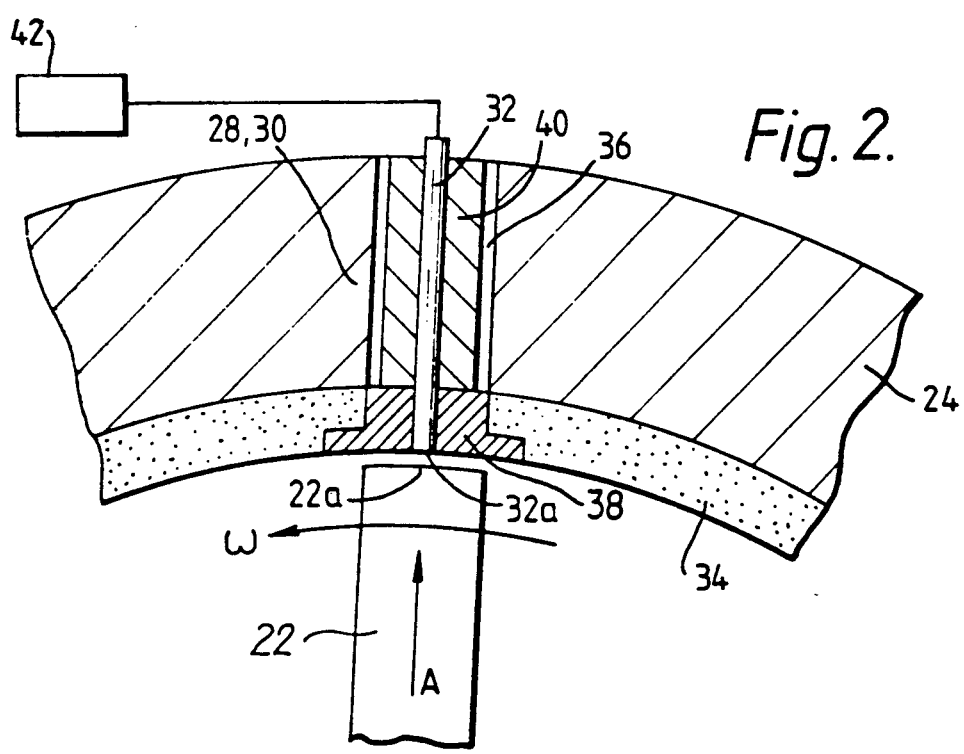
FIG. 2 is a segmented front elevation of a turbine blade and a portion of casing.
Figure 3:
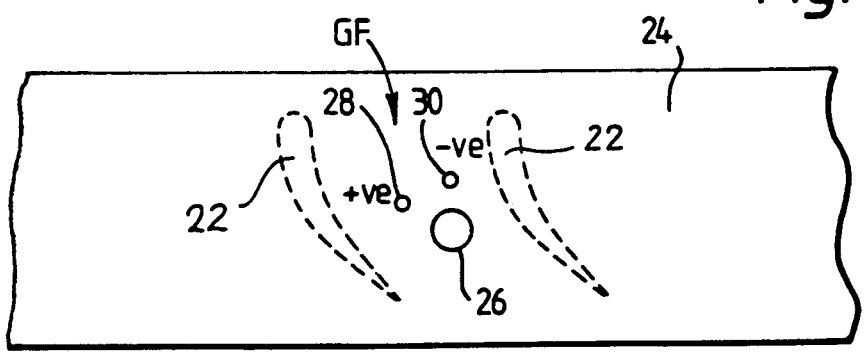
FIG. 3 is view in the direction of arrow A in FIG. 2.

Turning now to FIGS. 2 and 3, a pair of ion extractor electrodes 28, 30 are mounted within the casing 24 of the turbine 16 adjacent the tips 22a of a row of turbine blades 22. The DC capacitive tip clearance sensor 26 is similarly positioned within the casing 24 downstream of the extractor electrodes 28, 30.

Referring now more particularly to FIG. 2, each electrode 28, 30 is made simply by inserting the centre electrode 32 of a high temperature instrumentation cable 36 into a small (approx 1 mm) hole in the casing 24. A ceramic cement 38 is used to locate and insulate the tip 32a of the centre electrode 32 relative to the casing 24. In the specific embodiment shown, the ceramic cement is applied to a hole formed in the surface of an abradable coating 34 applied to the inner surface of the casing 24. The instrumentation cable 36 further includes a dialectric material 40 such as alumina which acts to surround the central electrode 32. It will also be noted from FIG. 2 that each extractor electrode 28, 30 is connected electrically to a voltage source 42 capable of supplying a high positive or negative voltage on demand. One extractor electrode 28 is polarized to a high positive potential and the other 30 to a high negative potential relative to the casing 24.

Figure 4:
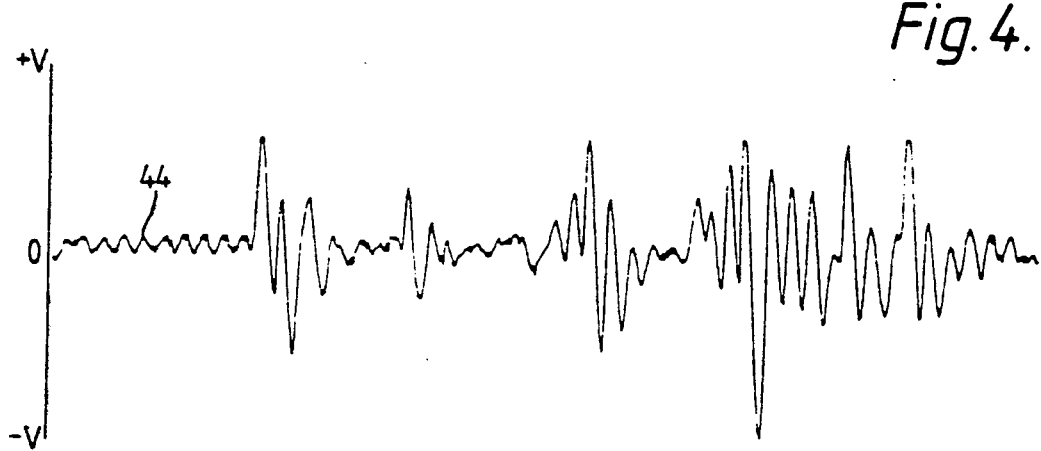
FIG. 4 is a representation of the output from a DC capacitance sensor before a polarizing voltage is applied to the electrodes of the present invention.

In operation, the DC capacitance sensor 26 measures the distance between the tip of each vane 22a and itself by monitoring the capacitance of the air gap therebetween. One well known method of displaying the results is by way of a voltage waveform on an oscilloscope. An example of an output taken in the ion rich atmosphere of a turbine is shown in FIG. 4. The normally comparatively uniform waveform, shown for example at 44, soon degenerates into an unreadable and widely varying series of excessive peaks as the charge the ions in the gas stream possess begins to adversely effect the measurement. Each excessive voltage peak can be directly attributed to the charge of one or more ions passing the sensor 26 at that particular time.

The present invention overcomes the above mentioned problem by polarizing one electrode 28 to a high positive potential and the other 30 to a high negative potential. The electrodes 28, 30 then set up a powerful electric field in the path of the ion rich gas flame which eminates from the combustors 14. The electric field acts to remove the charge carriers within said gas flame by attracting them to one or the other of said electrodes. It has been found that a polarizing voltage of approximately +500 V is sufficient to remove all the charge carriers present within the above mentioned environment. It will, however, be appreciated that different potentials may be applied in different applications.

Figure 5:
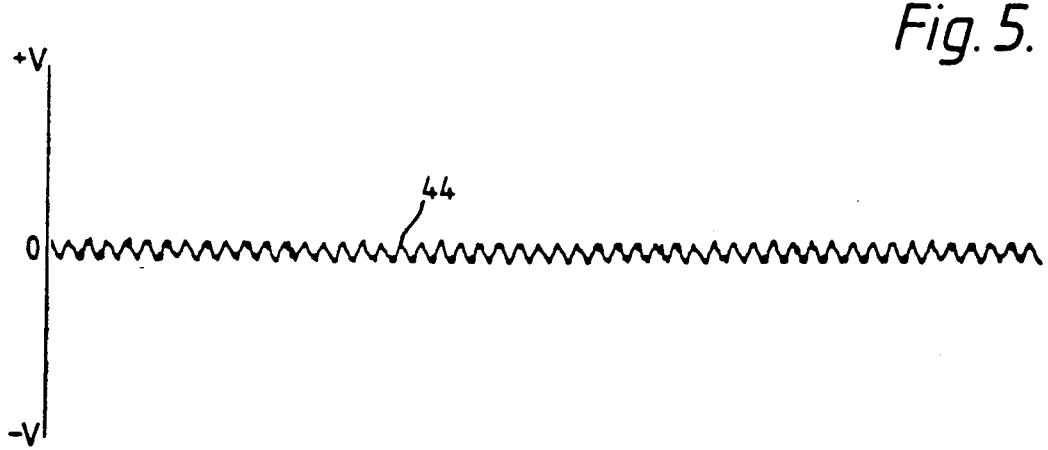
FIG. 5 is a representation of the output from a DC capacitive sensor after a polarizing voltage has been applied.

FIG. 5 illustrates the effect of the polarizing voltage being applied to the electrodes 28, 30. All the excessive peaks in the waveform have been removed and the normally comparatively consistent waveform 44 restored. Variations in the magnitude of this waveform can now once again be used to measure the tip clearance within the engine.

Whilst the above mentioned invention has been described with reference to a gas turbine engine 10 it will be appreciated that it is applicable to other similar environments and it is not intended that the scope of the invention should be limited to the above mentioned application. The method is of use in any measuring apparatus which monitors the capacitance of an air gap.

I claim:

1. A turbine blade tip clearance sensor for a gas turbine engine comprising:

a turbine casing which, in an assembled turbine having a plurality of turbine blades, encircles a rotary turbine stage, a d.c. capacitive measuring device having a blade tip clearance sensor first electrode embedded in the turbine casing opposite ends of the turbine blades as they rotate, second and third electrodes also embedded in the turbine casing adjacent the rotary turbine stage whereby in use the electrodes are upstream of the blade tip clearance sensor first electrode, means for electrically biasing the second and third electrodes relative to the first electrode, whereby the second electrode is biased to a positive potential relative to the first electrode and the third electrode is biased to a negative potential relative to the first electrode, whereby, in use, the second and third electrodes generate an electric field upstream of the first electrode which removes ions in the turbine hot gas stream immediately upstream of the blade tip clearance sensor first electrode.

* * * * *